Aug. 4, 1964  J. C. PENNOCK ETAL  3,143,046
CAMERA EXPOSURE CONTROL
Filed May 8, 1962  2 Sheets-Sheet 1

INVENTORS
John C. Pennock &
Charles A. Gregory, Jr.

BY Beale and Jones

ATTORNEYS

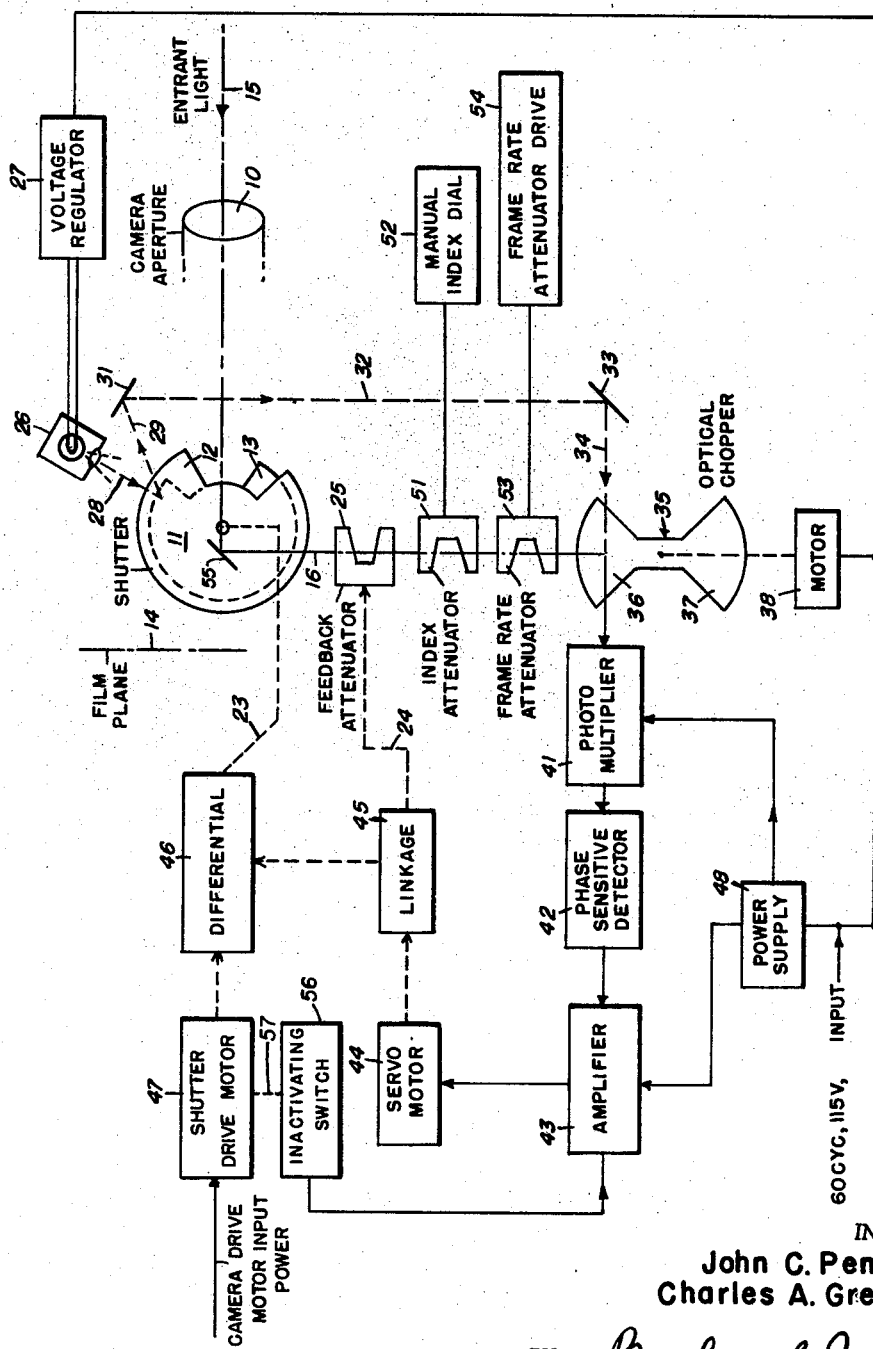

United States Patent Office 3,143,046
Patented Aug. 4, 1964

3,143,046
CAMERA EXPOSURE CONTROL
John C. Pennock, Santa Ana, Calif., and Charles A. Gregory, Jr., Richmond, Va., assignors to Flight Research, Incorporated, Richmond, Va., a corporation of Virginia
Filed May 8, 1962, Ser. No. 193,162
11 Claims. (Cl. 95—10)

This invention relates to the automatic control of exposure in a camera. It is particularly adapted, though not limited to, the automatic control of the shutter aperture of a rotary focal plane shutter in a moving picture camera.

Automatic exposure control requires sensing in some manner the ambient light and using the result of this sensing to control the amount of light which reaches the film so that the illumination of the film tends to be maintained constant.

In prior art automatic exposure control devices, this sensing has normally been done by the insertion of a sensing element or a beam splitter into the beam of light which enters the camera lens system, or by sensing other ambient light than that which enters the lens system. The insertion of an element into the entering beam of light, or the splitting away of a portion of it, reduces the amount of the light entering the lens system which is available to illuminate the film. Where other ambient light than that entering the lens system is sensed, there is obvious inaccuracy in that the light whose intensity is sensed is not the light which is to be used to illuminate the film.

It is therefore one object of this invention to provide an automatic exposure control whose sensor does not diminish the amount of light which would otherwise be available to illuminate the film.

It is a further object of this invention to provide an automatic exposure control whose sensor measures the light available to illuminate the film, and not the ambient light at some nearby point.

The device which operates from the information supplied by the sensor and controls the intensity of the illumination which is permitted to reach the film is usually an iris or the like positioned in the path of the light. This has the disadvantage of requiring an extra structure in the camera, usually a very complex one. It has another serious disadvantage for certain types of photography. It is often desirable, particularly in high speed photography such as required for missile tracking, to use the shortest exposure time possible in order to avoid the loss of object definition. Where an iris or other such device is placed in the path of the light beam which illuminates the film, it will diminish the amount of light available at the film, and thus the exposure time will have to be longer than it would have to be without the iris in order to obtain the same total amount of illumination of the film.

It is accordingly another object of this invention to provide an automatic exposure control which will allow the use of the shortest possible exposure times.

It is a still further object of this invention to provide an automatic exposure control in which the only manual adjustment required is the setting of a sensitivity adjustment to correspond to the sensitivity of the film being used in the camera.

This invention broadly comprises reflecting the entrant light from the back of the shutter (the surface of the shutter facing the camera aperture) while the shutter is closed, comparing this reflected entrant light with a standard, and using the results of this comparison to maintain constant the amount of light which is allowed to reach the film. Thus the sensing function causes no interference with the amount of light available at the film plane, since the sensing is done only during the time that the shutter is closed, when no light would reach the film anyway. Further, the sensing element, which senses light reflected away from the normal path, may be conveniently located outside of the normal light path, and thus will not obstruct the light which illuminates the film when the shutter is open. Since the measured beam is the reflected film-illuminating beam, there will be no error introduced by the fact that some other ambient light than that which will illuminate the film will be measured.

In the preferred embodiment of the invention, the result of the comparison of the light reflected from the back of the shutter with a standard is used to maintain the amount of film illumination constant by controlling the exposure time of the camera, thus achieving the desired result of allowing the use of the shortest possible exposure times.

The invention will be more fully understood by reference to the detailed description below, taken in conjunction with the drawings, in which:

FIG. 4 shows a more detailed schematic representation of the preferred embodiment shown in FIG. 1.

In the description in this application, and in the claims, the words "aperture" and "camera aperture," used interchangeably, mean that opening in the camera, usually occupied by a lens, through which the main or principal beam of light enters to illuminate the film; and the phrase "entrant light" shall designate that portion of the ambient light which enters the camera aperture.

Figure 1:
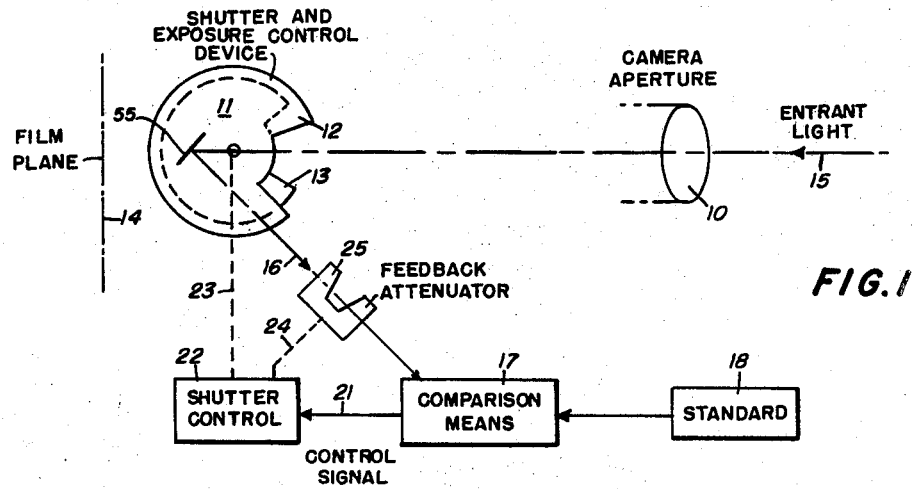
FIG. 1 shows in a broadly schematic manner the preferred embodiment of this invention, in which the camera shutter itself forms the exposure control device.

FIG. 1 shows, schematically represented, camera aperture 10, rotary shutter 11 comprising overlying shutter blades 12 and 13, and film plane 14. Entrant light 15 enters aperture 10 and is reflected from shutter 11 when it is closed. It is specifically reflected from that surface of shutter blade 12 which faces aperture 10. Preferably, shutter 11 is in a plane normal to the path of entrant light 15 and reflecting means 55 mounted on blade 12 is provided to reflect the light to comparison means 17. The shutter itself could be angularly disposed with respect to the path of entrant light to provide the reflecting action. The reflected entrant light 16 then enters comparison means 17 where it is compared with a standard 18. The result of this comparison supplies an indication of whether the intensity of entrant light 15 deviates from a predetermined desirable value. If it does, it will be necessary to adjust the exposure control device as a result of the comparison so that the desired level of illumination is obtained at the film plane.

The exposure control device in this embodiment is the shutter, whose aperture is formed by the registration of the cut-out portions of shutter blades 12 and 13. Varying the relative angular position of blades 12 and 13 changes the degree of registration of the cut-out portions, and thus varies the shutter aperture.

A control signal 21, which is a function of the comparison which has been made in comparison means 17, drives shutter control 22 which regulates the relative angular position of shutter blades 12 and 13 by a mechanical linkage 23, shown dotted.

While shutter control 22 will adjust the aperture of shutter 11 in the desired direction in response to control signal 21, in order for control signal 21 to be responsive to the change taking place in the shutter aperture, a feedback means is employed. The feedback means shown in FIG. 1 comprises a mechanical linkage 24 (shown dotted) from shutter control 22 which drives a feedback attenuator 25 in synchronism with the drive 23 for the shutter blade adjustment. Feedback attenuator 25 is placed in the path of reflected entrant light 16, and varies the amount of this light which reaches comparison means 17 in accordance with the variation in the aperture of shutter 11. The various components and their linkages are so adjusted and calibrated that when the shutter aperture reaches its desired dimensions, feedback attenuator 25 will have accordingly varied the intensity of reflected entrant light 16 so that the control signal 21 no longer drives shutter control 22 and the system becomes balanced.

While adjustment of the intensity of reflected entrant light 16 by an attenuator 25, as described above, is a preferred means for providing the feedback necessary in this embodiment because of the inclusion of most of the error producing components within the feedback loop, the method of illumination control embodied in FIG. 1 is not limited to this structure. The mechanical linkage 24, which is shown controlling attenuator 25, could be used instead to control a potentiometer or the like in comparison means 17. Or a purely electrical feedback of the magnitude of the shutter opening could be used, with the signal being fed back to comparison means 17.

The method of FIG. 1 may be practiced with any type of shutter, and is not limited to the overlying blade rotary type shown in FIG. 1.

Figure 2:
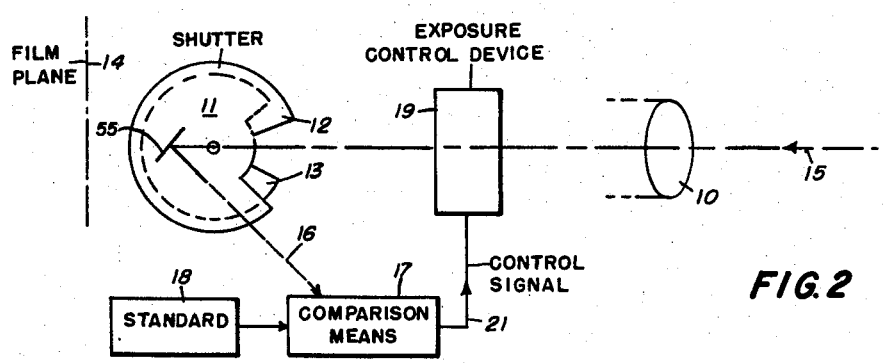
FIG. 2 shows in a broadly schematic manner a second embodiment of this invention, in which an exposure control device is inserted between the shutter and the aperture of the camera.

FIG. 2 shows another embodiment of the invention in which entrant light 15 is reflected from shutter 11 as in the preferred embodiment previously discussed and illustrated in FIG. 1, but which differs from that embodiment in that a separate exposure control device 19 is inserted between camera aperture 10 and shutter 11. Control signal 21, emanating from comparison means 17, controls the amount of light allowed to reach film plane 14 by varying the light transmissibility of control device 19 rather than by controlling the aperture of shutter 11 as in the embodiment of FIG. 1.

The FIG. 2 embodiment may require no separate feedback means, depending upon the nature of exposure control device 19 and the reflecting surface of shutter 11. If, in altering the amount of entrant light 15 which passes through it, it affects that portion which is reflected from shutter 11, then reflected entrant light 16 will be automatically adjusted in accordance with the adjustment taking place in exposure control device 19, and no separate feedback means is required. No such feedback means is shown in FIG. 2. However, it is possible that exposure control device 19 could be an iris whose periphery contracts to cut down light transmissibility; and if only the central portion of the beam of entrant light 15 were reflected to form reflected entrant light 16, then adjustment of exposure control device 19 would not affect reflected beam 16, and some form of feedback would be necessary. It could take any of the forms described with respect to the embodiment of FIG. 1.

Figure 3:
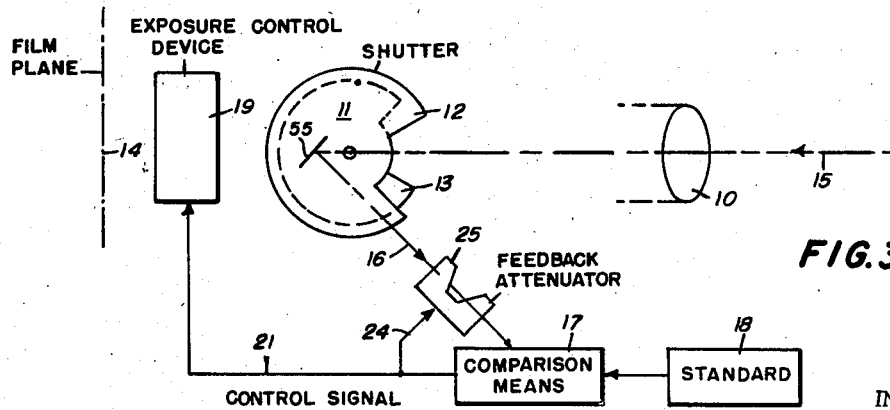
FIG. 3 shows in a broadly schematic manner a third embodiment of this invention, in which an exposure control device is inserted between the shutter and film plane of the camera.

FIG. 3 shows an embodiment of the inventive method and apparatus in which an exposure control device 19 is placed between the shutter and the film plane. It is similar in operation to the embodiment of FIG. 2, except that since the exposure control device is located behind the point where the entrant light is reflected from the shutter, it will not control the reflected light and a feedback means must be employed. The feedback device shown in FIG. 3 is the same as that shown in FIG. 1, although any of the feedback devices discussed in connection with the embodiment of FIG. 1 would be suitable for use with this embodiment.

FIG. 4 shows a more detailed system employing the preferred embodiment of FIG. 1.

The standard comprises a reference light 26 whose intensity is maintained essentially constant by means of voltage regulator 27 from which it operates. The beam of light 28 emitted by reference light 26 is reflected from shutter 11 in the direction shown by line 29; it is again reflected by surface 31 along line 32, and once more reflected from surface 33, which directs the beam along line 34 toward optical chopper 35. Reflected entrant light 16 is also directed toward optical chopper 35 at roughly right angles to the line 34 along which the reflected beam of standard light is directed.

Optical chopper 35 is a rotating member comprising two lobes 36 and 37 and is driven by motor 38. Chopper 35 is so arranged with respect to the beams of reflected entrant light and reflected standard light that when lobes 36 and 37 are rotated into a certain position, they will intercept the reflected entrant light 16 and reflect it along a path toward photomultiplier tube 41. While reflected entrant light 16 is being thus reflected toward photomultiplier tube 41, the particular lobe 36 or 37 which is reflecting it is blocking the passage of the reflected standard light. When lobes 36 and 37 are rotated so that neither of them reflects the reflected entrant light, they no longer block the passage of the reflected standard light, which is now permitted to illuminated photomultiplier 41.

As the optical chopper 35 is rotated as a constant rate, photomultiplier 41 will be illuminated at regular alternating intervals by the reflected entrant light and the reflected standard light. If these two illumination intensities are exactly equal, the illumination of photomultiplier 41 will be uniform. If they are not equal, the photomultiplier illumination will be in the form of an optical square wave, with the amplitude of the square wave comprising the difference in the levels of intensity of the two sources of illumination, and with the phase indicative of which source has the higher intensity. The square wave corresponding to the reflected entrant light's being of higher intensity will be 180 degrees out of phase with the signal corresponding to the reflected reference light's being of higher intensity.

The output of photomultiplier tube 41 will be an electrical square wave similar to the optical square wave which illuminated it. The electrical square wave, or error signals, at the output of photomultiplier 41 is fed to phase sensitive detector 42, which may be any detector of this type which is well known in the art. Phase sensitive detector 42 measures the amplitude of the square wave error signal and its phase (which indicates which of the two sources of illumination of photomultiplier 41 is stronger) and has an electrical output containing both the amplitude and phase information. This output is amplified by amplifier 43 and applied to servo motor 44.

Servo motor 44 is driven in the direction indicated by the phase information in its driving signal so as to tend to reduce the error signal by making an adjustment in the appropriate direction in the shutter aperture.

Servo motor 44 changes the width of aperture of shutter 11 by means of linkage 45 and differential mechanism 46. Linkage 45 controls the change of shutter opening as a function of the amount of change in light level. Normally, with a direct drive, the change in shutter opening in degrees would be directly proportional to the change in level of illumination. By providing a logarithmic linkage, however, the desired relation is achieved, whereby doubling the light level, whatever its absolute value, will result in halving the shutter aperture, so that the response of the system may be considered in terms of stops per second rather than in terms of degrees per second.

Differential mechanisms are well known in the art. Differential 46 may be any such mechanism which will adjust the relative angular position of shutter blades 12 and 13 via mechanical linkage 23 while they are being rotated by shutter drive motor 47.

Feedback attenuator 25 is placed in the path of reflected entrant light 16 and is actuated through a mechanical connection 24 with linkage 45. The motion of feedback attenuator 25 will thus be synchronized with the relative angular motion of shutter blades 12 and 13, and it will cause the amount of reflected entrant light 16 passing through it to be attenuated or increased as a function of the attenuation or increase in the entrant light 15 reaching the film plane. This attenuation or increase in the amount of the reflected entrant light 16 which passes through attenuator 25 will continue until the reflected entrant light which illuminates photomultiplier 41 is equal to the reflected standard light which illuminates it, at which time the optical and electrical square waves will have zero amplitude, the error signal will disappear and the servo motor will stop.

Whenever the position of shutter 11 is such that either entrant light 15 or the beam of reference light 28 is not reflected, but passes through the shutter aperture, it will be necessary to inactivate the control circuitry to prevent shutter aperture adjustment due to an erroneous signal. This may be conveniently accomplished, as shown in FIG. 4, by an inactivating switch 56. Switch 56 is mechanically connected to shutter drive motor 47 by means of linkage 57 and electrically connected to amplifier 43. When the angular position of drive motor 47 is such that either entrant light 15 or beam of reference light 28 may pass through shutter 11 rather than be reflected from it, switch 56 will inactivate amplifier 43 and prevent the shutter aperture from being adjusted in accordance with an erroneous signal. Switch 56 obviously need not be actuated from the drive motor, but may be connected at any point in the shutter drive mechanism from which an indication of the angular position of the shutter may be obtained. It also need not necessarily inactivate amplifier 43, but may inactivate the comparison and aperture control circuitry at any convenient point.

Power supply 48, shown operating from a conventional 115 volt, 60 cycle, A.C. supply, supplies the required operating power to photomultiplier 41 and amplifier 43.

Frame rate attenuator 53 is positioned in the path of reflected entrant light 16 and is driven by frame rate attenuator drive 54, which is a mechanism attached to the camera drive. When the speed of shutter rotation increases, the camera frame rate will increase and the frame time decrease, thus decreasing the amount of time during which the film is exposed to the entrant light, and accordingly decreasing the exposure of the film. To compensate for this decrease in film exposure caused by decreased frame time, frame rate attenuator 53 is moved to a position where it provides more attenuation of reflected entrant light 16. This causes the control system to call for more light, and the shutter aperture is correspondingly opened further.

Index attenuator 51 is another attenuator which is positioned in the path of reflected entrant light 16. Its position is adjusted by manual index dial 52 when the camera is loaded to calibrate the automatic exposure control system for the particular film being used.

In lieu of the mechanical attenuation of the light beam shown and described in the embodiment of FIG. 4, the attenuation desired could be provided by adjustment of electrical parameters in the electronics portion of the control circuitry, as, for instance, by potentiometers.

The path of the light from standard 26 need not be as shown, reflected from the shutter and other surfaces, but might well be beamed directly at the optical chopper from a standard located in roughly the same position as reflecting surface 33 occupies in FIG. 4.

The double lobed rotary optical chopper 35 shown and discussed is a convenient configuration, but any type of optical chopper which would cause two beams of light to fall on a surface alternately could be used.

These and other variations and modifications of the various embodiments of FIGS. 1 through 4 which may suggest themselves to those skilled in the art are within the contemplation of this invention.

It will be seen from the above that there has been described an accurate and versatile automatic exposure control for a camera which successfully fulfills the objectives of the invention as listed above.

We claim:

1. In a camera, the method of regulating an exposure control device so that the intensity of light incident upon the film tends to remain constant, comprising:
 (a) causing the entrant light to be reflected from the camera shutter when the shutter is closed;
 (b) comparing said reflected entrant light with a reference radiation of preselected constant value;
 (c) developing from said comparison a signal which is a function of the variation of the intensity of said reflected entrant light from that of said reference radiation; and
 (d) using said signal to adjust the exposure time control device of the camera in the direction indicated by said signal as necessary to compensate for said variation.

2. In a camera having a shutter, the improvement comprising:
 (a) a reflecting surface on a portion of the shutter which faces the entrant light and which blocks the entrant light from the film when the shutter is closed, whereby the entrant light will be reflected from said surface when the shutter is closed;
 (b) a reference radiation of a preselected constant value;
 (c) comparison means adapted to receive the entrant light which is reflected from said surface, compare it with said reference radiation, and develop from said comparison a signal which is a function of the variation of the intensity of the reflected entrant light from said reference radiation and indicates if the reflected entrant light has a higher intensity than the reference radiation;
 (d) shutter control means adapted to adjust the shutter aperture in the direction indicated by said signal; and
 (e) feedback means adapted to adjust said signal in accordance with the adjustment of the shutter aperture.

3. The camera of claim 2 wherein:
 (a) said shutter comprises two discs mounted for rotary motion in overlying relationship;
 (b) each said disc has a cutout portion, the shutter aperture being defined by the degree of registry of said cutout portions; and
 (c) the shutter aperture adjustment comprises varying the relative angular position of said discs, whereby the degree of registry of said cutout portions is varied.

4. The camera of claim 2 wherein:
 (a) said reference radiation comprises a light source of essentially constant intensity;
 (b) said comparison means includes a photoelectric device and an optical chopper;
 (c) said photoelectric device is so positioned as to be illuminated by both the reflected entrant light and the light from said constant intensity source;
 (d) said optical chopper is positioned in front of said photoelectric device and is adapted to permit the reflected entrant light and the light from said constant intensity source to illuminate said photoelectric device alternately, whereby the output of said photoelectric device is an alternating electrical signal whose alternations correspond to the alternations in the illumination of said photoelectric device;
 (e) said comparison means is operative only when illuminated by both the reflected entrant light and the light from said constant intensity source.

5. The camera of claim 4 wherein:
(a) said comparison means includes a phase-sensitive detector;
(b) said alternating electrical signal comprising the output of said photoelectric device is connected to the input of said phase-sensitive detector;
(c) said phase-sensitive detector is adapted to detect the phase and amplitude of said alternating electrical input signal and produce at its output an electrical signal which is a function thereof.

6. The camera of claim 2 wherein:
(a) said reference radiation comprises a light source of essentially constant intensity;
(b) said comparison means is adapted to compare the intensity of the reflected entrant light with the light from said constant intensity source; and
(c) said feedback means comprises a feedback attenuator adapted to regulate the intensity of the reflected entrant light before it is compared with the light from said constant intensity source by said comparison means.

7. The method of regulating the entrant light falling on the film of a camera which comprises the steps of:
(a) deflecting entrant light from the shutter when the shutter is closed
(b) measuring the difference of intensity between the deflected entrant light and a reference radiation; and
(c) developing a signal from said difference of intensity to vary the exposure time of the camera and thus control the amount of entrant light which will strike the film.

8. An automatic exposure control for a camera having film comprising in combination:
(a) a shutter having a surface to reflect entrant light when the shutter is closed
(b) a reference radiation of preselected constant value
(c) a comparison means for comparing the light reflected from said shutter with the reference radiation and producing a signal to adjust the exposure time of the camera and thus to adjust the amount of light available to expose the film.

9. The camera of claim 2 wherein said feedback means includes a frame rate attenuator adapted to regulate the intensity of the reflected light before it is compared with the light from said constant intensity source to correct for different camera frame rates.

10. The camera of claim 2 wherein said feedback means includes an index attenuator adapted to regulate the intensity of the reflected light before it is compared with the light from said constant intensity source to set the desired exposure level for a particular film.

11. In a camera, the method of regulating an exposure control device so that the intensity of light incident upon the film tends to remain constant, comprising:
(a) causing the entrant light to be reflected from the camera shutter when the shutter is closed;
(b) directing said reflected entrant light at a fixed point at regular, intermittent intervals;
(c) directing a reference beam of light at said fixed point at regular, intermittent intervals, the reference beam being directed at said fixed point during those intermittent intervals when said reflected beam is not so directed, whereby said point is alternately illuminated by said reflected entrant light and said reference beam;
(d) converting the alternating illumination of said point into an electrical signal which is a function of the alternating illumination and thus of the variation of the intensity of said reflected entrant light from that of said reference radiation; and
(e) using said signal to adjust the exposure control device of the camera in the direction indicated by said signal as necessary to compensate for said variation.

References Cited in the file of this patent

UNITED STATES PATENTS

| | | |
|---|---|---|
| 1,934,484 | Camilli | Nov. 7, 1933 |
| 2,683,402 | Bruck | July 13, 1954 |
| 2,858,750 | Farinet | Nov. 4, 1958 |
| 3,079,851 | Back | Mar. 5, 1963 |